United States Patent [19]

Lee

[11] Patent Number: 4,459,383

[45] Date of Patent: Jul. 10, 1984

[54] POLYAMIDE-IMIDE RESIN COMPOSITIONS AND ELECTRICAL CONDUCTORS INSULATED THEREWITH

[75] Inventor: Yue-Guey L. Lee, Schenectady, N.Y.

[73] Assignee: General Electric Company, Schenectady, N.Y.

[21] Appl. No.: 172,268

[22] Filed: Jul. 25, 1980

[51] Int. Cl.$^3$ .............................................. C08K 5/01
[52] U.S. Cl. .................. 524/871; 428/379; 428/395; 524/726; 524/771; 524/872; 524/873; 528/45; 528/48; 528/49; 528/52; 528/53; 528/54; 528/73; 528/74; 528/350
[58] Field of Search .................. 260/30.2; 528/45, 48, 528/49, 52, 53, 54, 73, 74, 350; 428/379; 524/871, 872, 873, 726, 771

[56] References Cited

U.S. PATENT DOCUMENTS

| | | | |
|---|---|---|---|
| 3,260,691 | 7/1966 | Lavin | 260/30.2 |
| 3,518,230 | 6/1970 | Sheffer et al. | 528/74 |
| 3,541,038 | 11/1970 | Nakano et al. | 260/30.6 R |
| 3,578,639 | 5/1971 | Sheffer | 260/30.2 |
| 3,625,911 | 12/1971 | Redman et al. | 260/30.2 |
| 3,790,530 | 2/1974 | Koerner et al. | 528/73 |
| 3,803,100 | 4/1974 | Izumi et al. | 528/52 |
| 3,843,587 | 10/1974 | Keating et al. | 528/73 |
| 3,884,880 | 5/1975 | Disgne et al. | 528/45 |
| 4,001,186 | 1/1977 | Onder | 260/30.2 |
| 4,045,407 | 8/1977 | Keske et al. | 528/350 |

FOREIGN PATENT DOCUMENTS

| | | | |
|---|---|---|---|
| 7403236 | 9/1974 | Netherlands | 260/30.2 |
| 1175555 | 12/1969 | United Kingdom | 260/30.2 |

OTHER PUBLICATIONS

Derwent Abs. 57176u/39, "Poly(amide-imides) Prep. . . . ", JA-4846697 (7-3-73) Hitachi Chem. Ind.
Derwent Abs. 83865w/51 (J5-0070-452) Dainippon Ink, "Cresol Sol Poly(amide-imide) . . . Pres. of 3° Amine Cat", (6-11-75).
Derwent Abs. 51233 V/28 Hitachi (Jun. 17, 1974), (J74023600), "Polyamideimide Series Resins . . . ".
Journal of Polymer Science: Part A-1, vol. 8, pp. 683-692 (1970)—Polyamide-Imides by S. Terney, J. Keating, J. Zielinski, J. Hakala and H. Scheffer.

Primary Examiner—Herbert J. Lilling
Attorney, Agent, or Firm—Hedman, Casella, Gibson & Costigan

[57] ABSTRACT

Novel polyamide-imide resin compositions, useful for electrically insulating conductors, are prepared by polycondensing a tribasic acid anhydride compound and a diisocyanate in an inert organic solvent in the presence of a catalytic amount of an oxyanion or amine compound at a high solids content, and controlling the reaction to prevent a great increase in viscosity.

1 Claim, 1 Drawing Figure

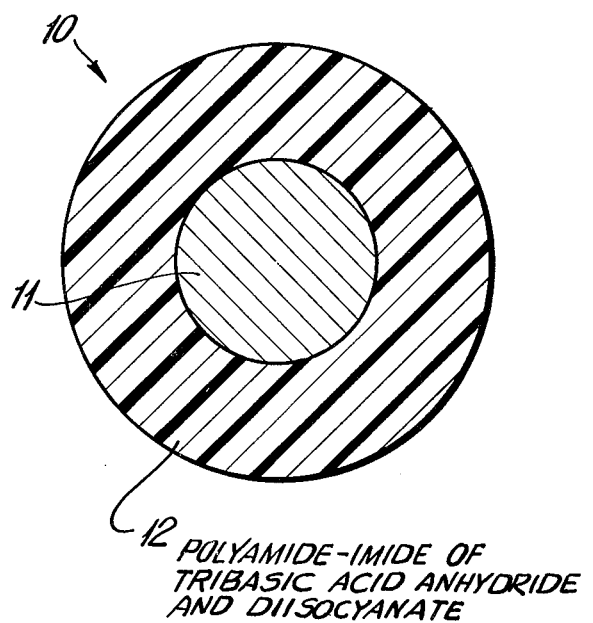

POLYAMIDE-IMIDE RESIN COMPOSITIONS AND ELECTRICAL CONDUCTORS INSULATED THEREWITH

The present invention relates to improved polyamide-imide resin compositions and to electrical conductors coated therewith. More particularly it relates to storage stable, high solids content, medium viscosity solutions of polyamide-imide resins derived from a tribasic acid anhydride and a diisocyanate.

BACKGROUND OF THE INVENTION

Polyamide-imides comprising the reaction products of tribasic acid anhydrides and a diisocyanate are known to form useful insulating coatings, e.g., for electrical conductors. See, e.g., Nakano and Koyama, U.S. Pat. No. 3,541,038. See also Terney et al., J. Polymer Science A-1, Vol. 8, pages 683–692 (1970). Applicant's copending application Ser. No. 137,991, filed Apr. 7, 1980, discloses that the reaction products of bisetheranhydrides and a diisocyanate are resinous products also having such utility. Moreover, applicant and her co-worker Zamek in a copending application, Ser. No. 138,198, filed Apr. 7, 1980, disclose that reaction products of tribasic acid anhydrides, bisetheranhydrides and diisocyanates are resinous reaction products with excellent high thermal resistance and electric insulation properties. The disclosures of the foregoing article, patent and applications are incorporated herein by reference.

As a result of numerous tests and experiments, certain deficiencies have been noted in wire coating compositions made following disclosures in the prior art. For one thing, the reactants appear to require somewhat longer times then the expected 2–4 hours to reach the great increase in viscosity suggested to be necessary. This has been overcome by applicant's discovery that oxyanion or amine compounds such as 2-methylimidazole, act as efficient catalysts in making the polyamide-imides by the earlier processes. In the earlier processes, too, the high molecular weight resins usually only produce enamel compositions with relatively low solids content, e.g., of below 30% by weight and usually of 21 to 25%. Such compositions require more passes through the coating machines to produce layers of suitable thickness. Moreover—inexplicably—if higher solids enamels are prepared by the prior art processes, the enamels have definitely poor shelf life. The prior art resins also are difficult, if not impossible, to dissolve in conventional solvents, i.e., those having a significant content of hydrocarbon, and this too is a disadvantage, because of economic considerations, but especially because of stability problems.

It has now been discovered that uniquely useful reaction products comprising polyamide-imide resins can be formed from the reaction of a tribasic acid anhydride and a diisocyanate if a catalyst is used and the reaction is short-stopped at a moderate viscosity at a high solids content. Moreover, even though they can be diluted to a low solids range, if the resins are applied from high solids solutions in an organic solvent they can be used as such for top coats. Surprisingly good shelf lives are obtained. The products find use as insulating coatings for electrical conductors, e.g., magnet wire and magnet strip, because they have good runnability and provide excellent electrical insulation properties. In addition, the high solids content enamels or this invention show less tendency to develop haze, which is another indication of their superiority.

In preferred features, the resin will be prepared in the presence of a catalytic amount, from a trace to about 10 mole percent (based on the tribasic acid anhydride) of an oxyanion compound, or an amine, secondary or tertiary, e.g., trimethyl amine, triethyl amine, di-n-butyl amine, pyridine, 2-phenylimidazole, imidazole, water, organotin compounds, and the like, preferably 2-methylimidazole. The term oxyanion defines a family of compounds known to catalyze the reaction of isocyanates.

The tribasic anhydride component, is described in the above-mentioned Nakano et al. U.S. Pat. No. 3,541,038. Suitable are aromatic, aliphatic and alicyclic tribasic acid anhydrides, such as, for example, trimellitic anhydride, hemimellitic anhydride and aconitic anhydride. Trimellitic anhydride is preferred.

The organic diisocyanates can be prepared in ways known to those skilled in this art, and they are also commercially available. Any of those described in U.S. Pat. No. 3,541,038 can be used. For example, $C_4$–$C_{24}$ alkyl, cycloalkyl or aryl diisocyanates are useful, e.g., hexamethylene diisocyanate, tetramethylene diisocyanate, and the like, cyclohexane diisocyanate, cyclopentane diisocyanate, and the like, diphenyl oxide diisocyanate, diphenylmethane diisocyanate, tolylene diisocyanate, phenylene diisocyanate, xylenyl diisocyanate, diphenylsulfone diisocyanate, naphthalene diisocyanate, and the like can be used. It is seen from the foregoing illustrations that the $C_4$–$C_{24}$ carbon chains can be interrupted by hetero atoms such as oxygen, nitrogen, sulfur, and the like.

Preferred are diphenylmethane diisocyanate, diphenyl oxide diisocyanate and hexamethylene diisocyanate.

The polymer is prepared from the reaction of tribasic anhydride and the corresponding diisocyanate (DI) in the presence of the catalyst, in an organic solvent, such as N-methylpyrrolidone (NMP), dimethylacetamide (DMAC), or mixtures containing an aromatic hydrocarbon, e.g., of 6 to 40 carbon atoms, e.g., xylene, or a proprietory aromatic hydrocarbon solvent, e.g., Solvesso 100, Mixed solvents can comprise NMP-DMAC, or NMP-xylene. As has been mentioned, hydrocarbon alone will not function as the inert solvent.

The preferred reaction pathway uses trimellitic anhydride, and is as follows:

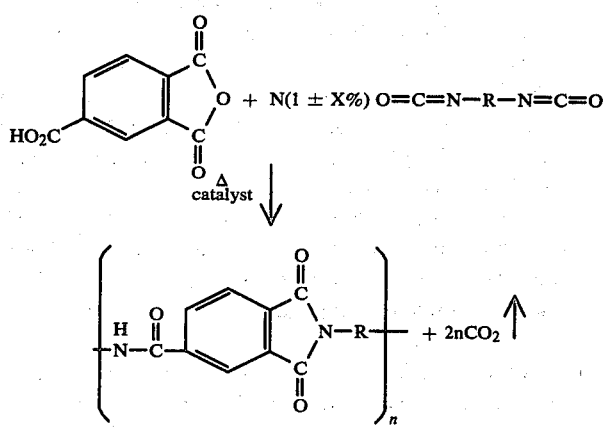

where R is divalent alkylene, cycloalkylene, arylene, of from 4 to 24 carbon atoms, or a mixture thereof.

The optimum mole ratio of DI (analog) to TMA is 0.95 to 1.05, preferably 0.99–1.01 to 1.00, and the catalyst is 5–10 mole %, based on dianhydride. To make a coating composition the resin can be prepared in the organic solvent, e.g., NMP, NMP-DMAC, NMP-xylene or Solvesso 100, etc., or the resin can be isolated, then redissolved in such solvents, or in methylene chloride, dimethyl formamide, and the like. Cresylic acid and/or phenol cannot be used.

Preparative methods are used which are not conventional in the sense set forth in the above-mentioned U.S. Pat. No. 3,541,038.

For example, instead of heating the reactants at 60° to 200° C., in the absence of a catalyst, a catalytic amount of an oxyanion or amine compound, e.g., 2-methylimidazole, is used. Instead of heating until the "viscosity is greatly increased" (Examples 1, 2, 3 of Nakano) or to a constant viscosity, i.e., the highest which can be reached, it is essential to short-stop the reaction, e.g., by cooling and/or adding more solvent and/or a terminating agent, at a moderately low viscosity, e.g., a Gardner viscosity no higher then Z3 to Z6, at a solids content of between 31 and 45% by weight. Also contemplated to control the viscosity is to use a monofunctional compound, i.e. isocyanate, anhydride, or carboxylic acid, or active hydrogen compound, as a viscosity controlling agent or terminating compound. This can be added prior to heating, and in this case tends to slow the viscosity build rate, and permit more latitude in the time allowed to terminate, e.g., by cooling and/or adding solvent. Alternately, the terminating agent can be added when the viscosity reaches the desired level, and this not only prevents immediate increases, but tends to prevent any increase in storage. Suitable terminating agents are numerous, for example, there can be used phenyl, isocyanate, benzoic acid, phenol, t-butyl alcohol, diethylene glycol monomethyl ether (DM), and the like. The latter two are preferred.

In any case, the viscosity end point is important to observe. To fail to do so is to risk the likelihood of producing high solids enamels which are unstable.

After the resin has been made, if desired, it can be adjusted to a solids content of no less than 30% by weight with one of the solvents disclosed herein, but preferably a mixture of such solvents. In any case, the preferred mixture will comprise N-methylpyrrolidone and an aromatic hydrocarbon solvent Solvesso 100, well known for making coating compositions. Conveniently, the organic solvent mixture can also be of the same composition employed as the inert reaction solvent. The mixed solvent can vary in ratio, but most preferably, from about 2 to 4 parts by weight of N-methylpyrrolidone per 1 part by weight of aromatic hydrocarbon will be used. In optimum cases, the final viscosity, measured on a Brookfield apparatus at 25° C. with Number 3 spindle at 10 and 20 rpm will be in the range of 2800–4000 cps at 31 to 33 percent solids. This corresponds to a Gardner viscosity of Z3/4 to Z2¼. In the optimum composition, also at this solids level, the acid number will be no less than about 4 and within the range of 4–8.

Such enamels can be used as a top coat over a polyester or a polyesterimide base coat at any solids content, or as a sole coat at solids contents below about 32% by weight.

In accord with conventional practices, other additives may be formulated into the compositions, such as, without limitation, minor proportions of aliphatic amino compounds, conventional phenolic resins, titanate esters, blocked polyisocyanates, and the like.

BRIEF DESCRIPTION OF THE DRAWING

In the drawing, the FIGURE shows a section of a magnet wire made according to this invention.

DESCRIPTION OF THE PREFERRED EMBODIMENTS

In the FIGURE, a magnet wire indicated generally by the numeral 10 has a conductor 11 covered with a layer 12 of a resinous polyamide-imide of a tribasic acid anhydride and a diisocyanate. Although the drawing illustrates a conductor 11 that is circular in section, it will be understood that square or rectangular conductors in the form of flat strips or foils may also be used without departing from the invention.

A suitable polyamide-imide for layer 12 can be made following Examples 1 and 2.

Wire test properties are carried out by standard tests. "Flexibility 25+" is done by elongating a specimen, winding it ten times around a mandrel and examining for adherence failure, and the values are expressed in units comprising mandrel diameters (Reference GE METHOD E18B4). Heat shock at −20% −30° −200° C. is done by elongating a specimen, winding not more than ten times around a mandrel, removing the wound wire, placing in an oven for ½ hour, allowing to cool to room temperature and examining for failure and the values are expressed in units comprising mandrel diameters (Reference GE METHOD E18H3). Cut Through temperature is done by positioning two lengths of wire at right angles, loading one with a weight and raising the temperature until thermoplastic flow of the coating causes an electrical short, and the values are expressed units comprising degrees Centigrade at 2000 g. (Reference NEMA METHOD 50.1.1).

EXAMPLE 1

Three moles, 750 grams of diphenylmethanediisocyanate (MDI), 3.03 moles (582 grams) of trimellitic anhydride (TMA), 0.15 mole (12.3 grams) of 2-methylimidazole, 1661 g. of N-methylpyrrolidone and 722 g of xylene (or Solvesso 100) are heated from room temperature to 135° C. in approximately 1.5 hours and held at 135° C. for 5¼ hours until a Gardner viscosity of Z3-4 is obtained at 36% solids. During the reaction, the solution changes from yellow, to orange, to red, to dark red during the first 1.5 hours, and carbon dioxide is given off vigorously between 100°-135° C., and after 0.5 hours at 135° C., the rate of decarbonylation becomes very small. Thereafter, the solution viscosity gradually increases with continued very minor evolution of carbon dioxide. The reaction is shortstopped by adding a mixture of 252 g. of N-methylpyrrolidone and 109 g. of xylene (or Solvesso 100). This reduces the final viscosity down to Gardner about Z1¼ at 32% solids.

The composition can be used to coat electrical conductors as a sole coat, or as a top coat wire enamel over polyester or polyesterimide.

Although diphenylmethanediisocyanate is shown, it can be partially or completely replaced by diphenylether diisocyanate, and by hexamethylene diisocyanate.

The composition of Example 1 is applied to 0.0403" copper wire as a sole coat in a commercial wire tower. A build of 3.0-3.2 mil. is obtained in seven passes. The following properties are observed.

| Speed (ft./min.) | 35 | 40 |
|---|---|---|
| Flexibility 25+ | 2X | 2X |
| Heat Shock -20% -30' -260° C. | 2X | 2X |
| Cut Through Temperature, °C. at 2000 g. | 420 | 404 |

An excellent quality smoothyl coated insulated conductor is obtained.

The composition of Example 1 is applied to 0.0403" copper wire as an overcoat over an ethylene glycol-tris (2-hydroxyethyl) isocyanurate terephthalate polyester undercoat (Schenectady Chemical's ISONEL 678). A final build of 3.0-3.1 mils. is obtained. The following properties are observed:

| Speed (ft./min.) | 45 | 40 |
|---|---|---|
| Flexibility 25+ | 1X | 1X |
| Heat Shock -20% -30' -260° C. | 3X | 2X |
| Cut through Temperature, °C. at 2000 g. | 383 | 399 |

An excellent quality dual-coated conductor is obtained.

EXAMPLE 2

A suitable commercial size reaction kettle, column, condenser and filter press are washed with N-methylpyrrolidone, set for a total reflux, and a nitrogen flow of 20 cubic feet/hour is started. There is added 40.6 parts of N-methyl pyrrolidine and 17.7 parts of aromatic hydrocarbon solvent (Solvesso 100), and the agitator is started. Next, 18.3 parts of diphenylmethane diisocyanate and 14.2 parts of trimellitic anhydride are added. Then 8.3 parts of 2-methylimidazole (catalyst) is added. The batch is heated to 135° C. Decarboxylation occurs at a slow to fast rate. After one hour at 135° C., samples are taken every ¼ hour for viscosity by the Gardner method at 25° C., acid number, and % solids at 200° C. The batch is held at 135° C. until the viscosity is Z3-Z4, the acid number is 5-9 and the % solids is 34-36. When these control points have been met, 4.8 parts of N-methyl pyrroldone and 2.1 parts of Solvesso 100 are added. The batch is cooled to 60° C. and tested again. The Brookfield viscosity desired at 25° C., number 3 spindle, 10-20 rpm is 2800-4000 cps., the acid number desired is 4-8, and the % solids at 200° C. should be 31-33%. If necessary, a suitable amount of a mixture comprising 1.4 parts of N-methylpyrrolidone and 0.6 parts of Solvesso is added to meet specifications above.

If for comparative purposes, two compositions are made without a catalyst, and having, respectively solids contents/viscosities of 29%Z1¾ and 33%/Z 4¾, respectively, the cured films are flexible and the infared spectra are similar to those of Examples 1 and 2, but in sole coat applications, the wires are blistery and the electrical resistance continuity is very poor.

EXAMPLE 3

Following the general procedure of Example 1, a chain terminating agent, diethylene glycol monomethyl ether (DM), is used. Four and eight-tenths grams (0.04 mole) of DM is added into a reaction mixture which contains 384 g. (2.0 mole) of trimellitic anhydride, 505 g. (2.02 mole) of diphenylmethanediisocyanate, 8.2 g. (0.1 mole) of 2-methylimidazole, 1283.3 g. of N-methyl pyrrolidone and 558 g. of xylene. The reaction mixture is heated from room temperature to 135° C. in about 1¾ hours, and held at 135° C. for 10 hours until a viscosity of 5060 centistokes (Gardner Z3¼) is obtained at 31% solids. This composition, as such, is suitable for use as a wire coating enamel.

It can also be diluted to 25% solids in 2.2/1 NMP/xylene to produce wire enamel. At 2.3/1 NMP/xylene, less suitable coatings are obtained.

Instead of adding the DM terminating agent at the beginning, it can be added at the end of the polycondensation. It is also suitable to substitute t-butyl alcohol as a terminating agent.

If maleic anhydride is used for this purpose, adding at the beginning will cause gel to form after 1¼ hours at 135° C. It is acceptable, however, to add it after polycondensation is complete.

EXAMPLE 4

Although NMP/DMAC/xylene combined are not suitable as an inert reaction solvent because there is produced a cloudy, brown solution, a very good overcoat enamel is prepared by the reaction of 1.01 mole of diphenylmethanediisocyanate, with 1.0 mole of trimellitic anhydride in N-methylpyrrolidone/dimethylacetamide (NMP/DMAC), and this can be finally diluted with aromatic hydrocarbon (Solvesso 100) to give 37% solids in 2.86/2.86/1 NMP/DMAC/Solvesso 100. Prolonging the reaction at 135° C., and then diluting with Solvesso 100 to give a 32% solids content in 1.15/1.15/1 NMP/DMAC/Solvesso 100 system is not quite as good as the 37% in top coat applications.

Many variations will suggest themselves to those skilled in this art in light of the above, detailed description. All such modifications are within the full intended scope of the appended claims.

I claim:

1. An electrical conductor insulating coating composition comprising at least about 30% by weight of a resin dissolved in an organic solvent, said resin comprising a polyamide-imide prepared by subjecting a tribasic acid anhydride and 0.95 to 1.05 moles, per mole of the tribasic anhydride, of an organic diisocyanate compound, or a mixture of such compounds, of the formula $$O=C=N-R-N=C=O$$

wherein R is a divalent alkylene, cycloalkylene or arylene group of from 4 to 24 carbon atoms to polycondensation at a temperature of about 60° to 200° C. in the presence of an inert solvent and a catalytic amount of 2-methylimidazole comprising from trace amounts up to about 10 mole percent, based on the tribasic acid anhydride, until a Gardner viscosity of no higher than Z3 to Z6 is obtained at a solids content of between 31 and 45% by weight and terminating the polycondensation.

* * * * *